United States Patent [19]
Davis

[11] Patent Number: 5,558,364
[45] Date of Patent: *Sep. 24, 1996

[54] PLASTIC AIR BAG COVER HAVING AN INTEGRATED LIGHT SOURCE

[75] Inventor: David J. Davis, Troy, Mich.

[73] Assignee: Larry J. Winget, Leonard, Mich.

[ * ] Notice: The term of this patent shall not extend beyond the expiration date of Pat. No. 5,549,323.

[21] Appl. No.: 477,873

[22] Filed: Jun. 7, 1995

[51] Int. Cl.⁶ .............................. B60R 21/20; B60Q 3/04
[52] U.S. Cl. .................................. 280/728.3; 280/730.2; 280/732; 362/80; 40/593
[58] Field of Search .................................. 280/735, 734, 280/728.1, 728.3, 731, 732, 730.1, 730.2; 180/272, 273; 340/436, 438; 362/80, 83.3, 812; 40/593, 544, 564

[56] References Cited

U.S. PATENT DOCUMENTS

| | | | |
|---|---|---|---|
| 4,938,504 | 7/1990 | Fukuda et al. | 280/731 |
| 5,062,661 | 11/1991 | Winget | 280/731 |

FOREIGN PATENT DOCUMENTS

| | | | |
|---|---|---|---|
| 3619937 | 12/1987 | Germany | 280/735 |
| 4414761 | 11/1994 | Germany | 280/735 |

*Primary Examiner*—Kevin Hurley
*Assistant Examiner*—Peter C. English
*Attorney, Agent, or Firm*—Brooks & Kushman P.C.

[57] ABSTRACT

A plastic air bag cover is provided with an integrated light source and is adapted for use within a passenger compartment of a vehicle. The light source is mounted on a base plate and a front plate cooperates with the base plate to seal the light source therebetween. The front plate is provided with indicia capable of transmitting light therethrough, the indicia represent graphical information wherein light transmitted through the indicia causes an information-bearing image to be projected into the passenger compartment through a window formed in a front panel of the air bag cover. The light source may be an emissive display such as an electroluminescent or thin film electroluminescent display. Alternatively, the light source may be a flat panel display such an emissive display or an electroluminescent display.

18 Claims, 4 Drawing Sheets

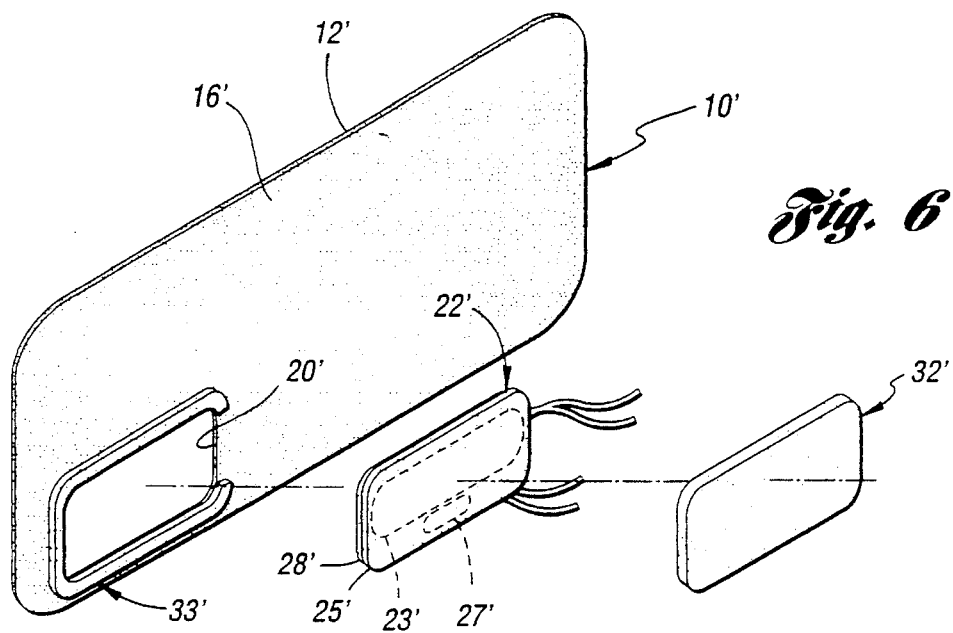
Fig. 6
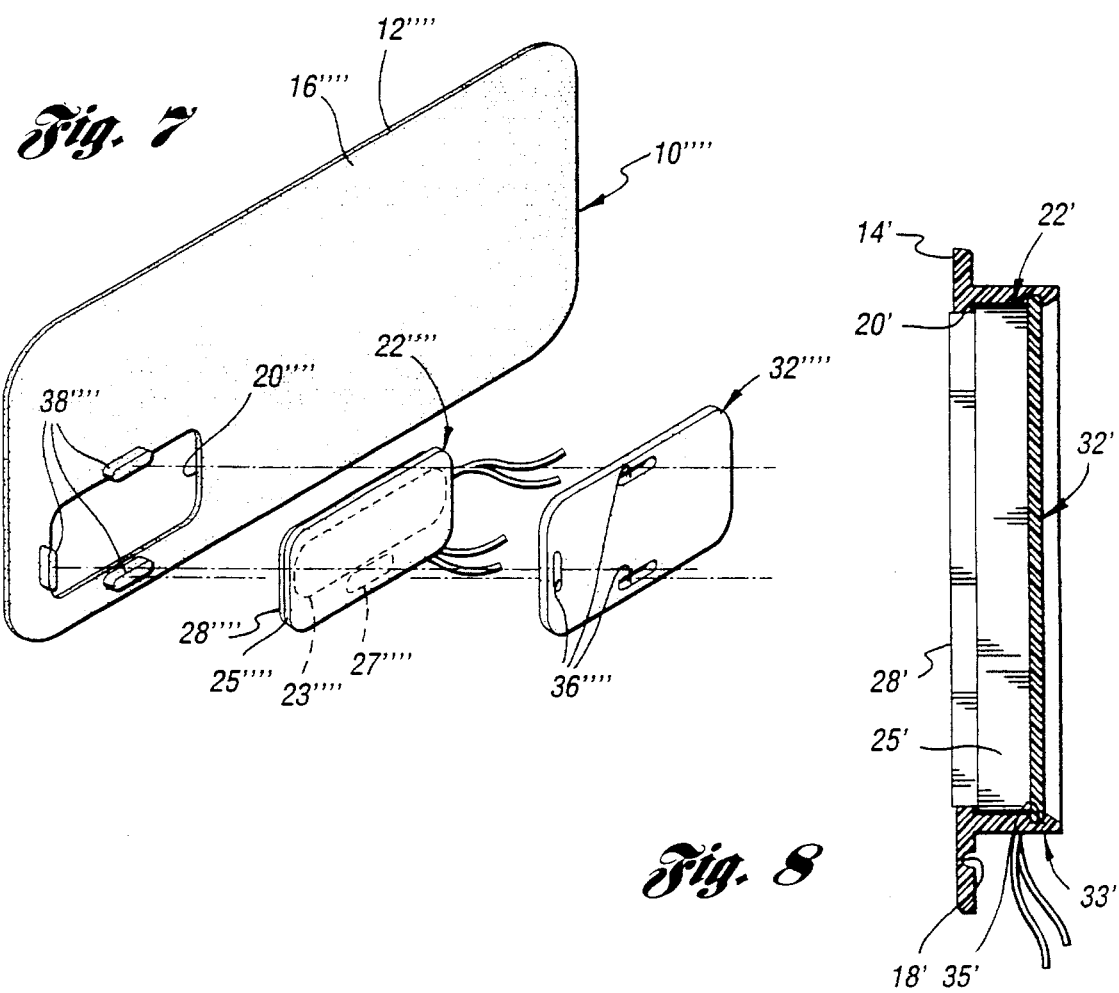
Fig. 7
Fig. 8

PLASTIC AIR BAG COVER HAVING AN INTEGRATED LIGHT SOURCE

CROSS-REFERENCE TO RELATED APPLICATIONS

This invention is related to U.S. patent application Ser. No. 08/407,925, filed Mar. 21, 1995, entitled "Air Bag Cover Having A Switch Assembly Disposed Therein". This invention is also related to U.S. patent application Ser. No. 08/458,882, filed Jun. 2, 1995, entitled "Thermoplastic Air Bag Cover Having A Membrane Switch". This invention further relates to U.S. patent application Ser. No. 08/451,458, filed May 26, 1995, entitled "Thermoplastic Air Bag Cover Having A Domed Front Panel And Unitary Multi-functional Switching Module", and U.S. patent application Ser. No. 08/477,872, filed Jun. 7, 1995, entitled "Plastic Air Bag Cover Having An Integrated Occupant-Sensing Sensor Module".

TECHNICAL FIELD

This invention relates to plastic air bag covers having light sources incorporated therein.

BACKGROUND ART

Presently, when one or more air bags are provided in an automobile, the air bag may be stored in a steering wheel, in a seat bottom side or seat back side or door panel or in an instrument panel (i.e., IP) of the vehicle. During automatic inflation of the air bag, at least a portion of the air bag cover moves away from the air bag container to permit the air bag to perform its safety function between its container and the occupant of the vehicle.

A recent practice in the automotive industry is utilization of all plastic fabricated air bag covers. Conventional air bag covers used in conjunction with occupant restraint systems often include various connection systems for attaching the air bag cover to the air bag container.

The U.S. Pat. No. 5,062,661, to Winget, discloses a rigid plate attached to a substantially rigid remainder of a front panel of an air bag cover to define a hollow compartment which, together, move upon manual actuation of a flexible manually operable diaphragm at the front surface of the front panel. Upon separation from the side panel, the front panel, including the diaphragm, the hollow compartment, and a rigid plate move together to permit the inflating air bag to leave the cover. The front panel has a first electrically conductive inner surface for making a circuit path with a corresponding second electrically connected inner surface of the rigid plate.

It is desirable to have an air bag cover which conveys information to an occupant of the vehicle that behind the air bag cover there is a supplemental restraint system (SRS), such as an air bag, which will protect the occupant. This provides reassurance in the form of a reminder that the occupant has extra protection.

Current air bag covers have the phrase "SRS Air Bag" embossed into the front panel of the air bag cover. However, such phrases cannot be seen at night or under poor lighting conditions.

SUMMARY OF THE INVENTION

An object of the present invention is to provide an air bag cover having a light source module incorporated therein to project an information-bearing image within a passenger compartment and which is relatively simple and reliable, economic to manufacture, and easily assembled and tested.

In carrying the above object and other objects of the present invention, a plastic air bag cover having an integrated light source and adapted for use within a passenger compartment of a vehicle is provided. The cover includes a front panel adapted to overlie an undeployed air bag. The front panel has a front outer surface and a rear inner surface. The front panel also has a window associated therewith which is capable of transmitting light therethrough. The cover also includes a light source module including a base plate and a light source mounted on the base plate. Finally, the cover includes a back plate secured to the rear inner surface of the front panel in containing relationship to the light source module to form a hollow compartment for the light source module. Light from the light source is transmitted through the window to provide an information-bearing image within the passenger compartment whereby information is provided to a passenger of the vehicle.

Preferably, the light source module includes a front plate secured to the base plate to form a sealed compartment for the light source. The front plate is provided with indicia capable of transmitting light therethrough and representing graphical information. Light from the light source transmitted through the indicia causes the image to be projected into the passenger compartment.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 6 is a rear perspective exploded view of the air bag cover of FIG. 2 and illustrating a first mechanism for securing a light source module at the rear inner surface of a front panel of the cover;

FIG. 7 is a view similar to FIG. 6 illustrating a second mechanism for securing the light source module at the rear inner surface of the front panel;

FIG. 8 is a view, partially broken away and in cross-section, of the light source module secured at the rear inner surface of the front panel.

BEST MODE FOR CARRYING OUT THE INVENTION

Figure 1:
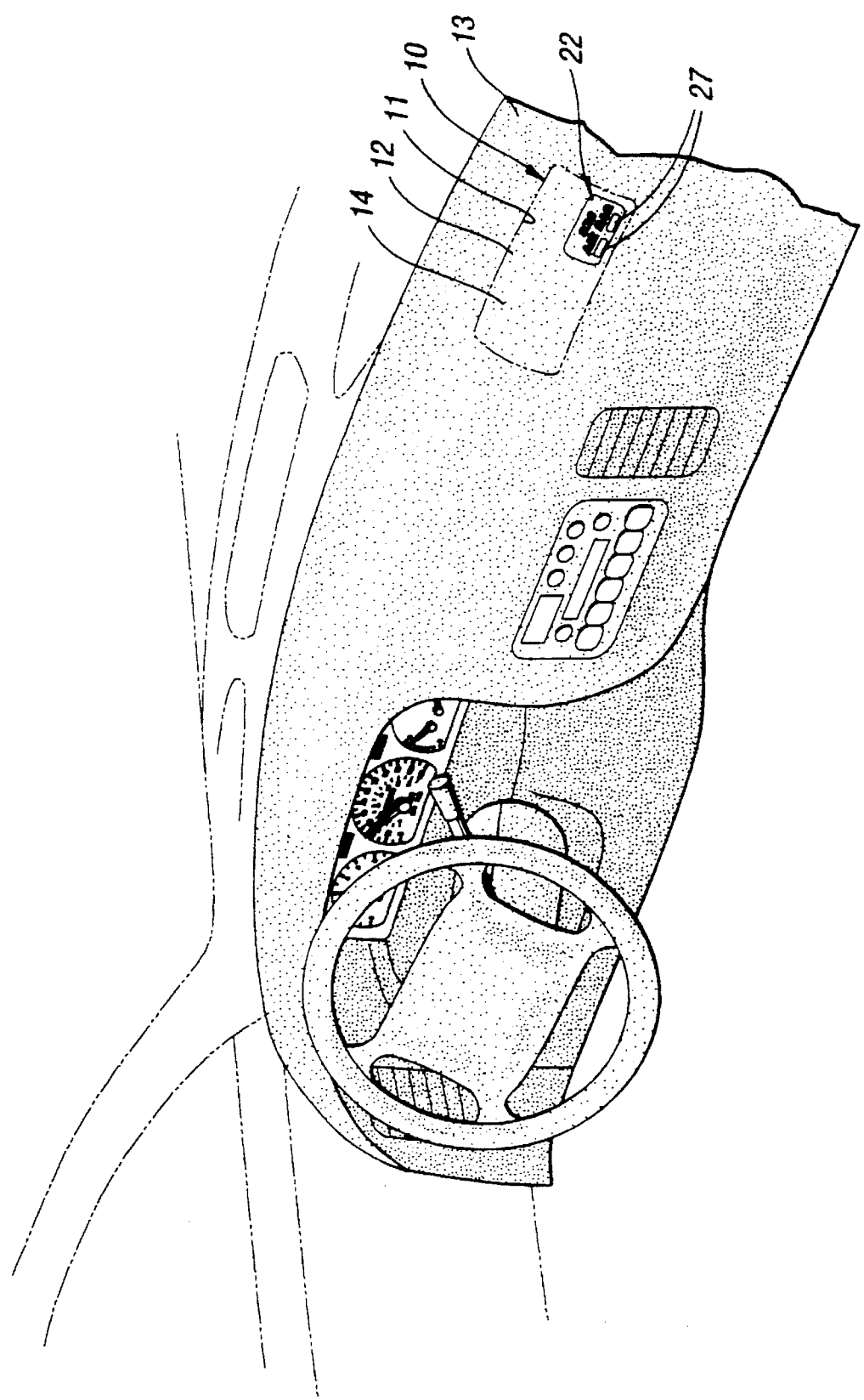
FIG. 1 is an environmental perspective view illustrating an air bag cover constructed in accordance with the present invention.

Referring now to the drawing Figures, there is illustrated in FIGS. 1–9 different embodiments of an automotive air bag cover or door constructed in accordance with the present invention. In the embodiments of FIGS. 1–8, each automotive air bag cover is adapted to be secured within an opening 11 of an instrument panel 13 of a motor vehicle as illustrated in FIG. 1.

Each of the air bag covers is preferably a relatively flexible thermoplastic air bag cover formed by injection molding with a thermoplastic such as Santoprene® (a trademark of Monsanto Co.)

Figure 3:
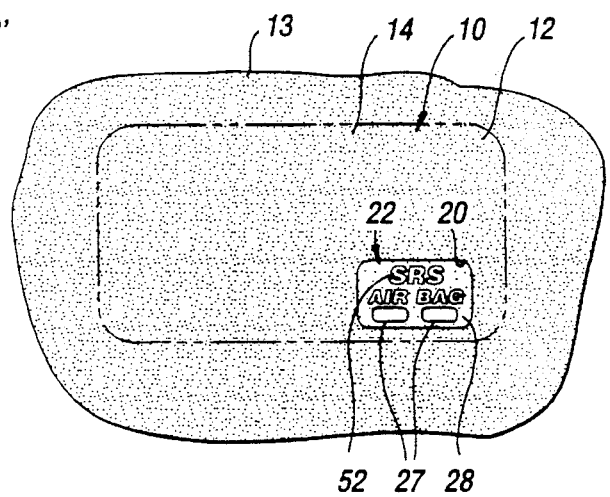
FIG. 3 is a view similar to FIG. 2 illustrating the air bag cover of FIG. 1.

Referring now to FIGS. 1 and 3, one embodiment of an air bag cover, generally indicated at 10, includes a front panel 12 overlying an undeployed air bag (not shown). The front panel 12 has a front outer surface 14 and a rear inner surface (now shown). The front panel 12 may be separable along a prescribed tear pattern a portion of which is shown in FIG. 8 at 18' upon deployment of the air bag. The front panel 12 also has a rectangular window 20 extending completely therethrough between the front outer surface 14 and the rear inner surface at a corner portion of the front panel 12.

The cover 10 also includes a unitary light source and sensor module, generally indicated at 22, which lies behind the rear inner surface of the front panel 12 in the same fashion as module 22' (FIG. 6) and module 22'''' (FIG. 7) lie behind their respective rear inner surfaces 16' and 16' of the front panels 12' and 12'''', respectively.

It is to be understood that the same or similar parts of the different embodiments have the same reference numeral but have a different prime designation to distinguish between the different embodiment.

The modules 22' and 22'''' are adapted to be electrically coupled to an electrical supply system of a motor vehicle. The unitary module 22' may comprise a rigid insularire material such as an injection molded plastic base plate 25' with a light source 23' comprising an emissive or flat panel display or the like embedded in the base plate 25' such as by insert molding. The emissive display may comprise an electroluminescent display such as a thin film electroluminescent display, an LED, a photoluminescent display, or a plasma display. The flat panel display may be an electroluminescent display such as a thin film electroluminescent display, a plasma display or a non-emissive display such as a liquid crystal display or an optical fiber.

The module 22' also includes at least one sensor 27' mounted on the base plate 25'. The sensor 27' may be any of a variety of known miniature sensors to sense when a passenger is not occupying the front passenger seat or when it is not desirable to have the passenger side air bag deploy such as when an infant is seated in a child seat thereat. The sensor 27' may comprise an ultrasonic sensor, an electromagnetic sensor, an optical sensor, an infrared sensor, or the like.

The module 22' also includes a front plate 28' secured to the base plate 25' wherein at least a portion of the front plate 28' allows light to be transmitted therethrough. The front plate 28' is aligned with and extends through the window 20' above the front outer surface 14' of the front panel 12'. The base plate 25' and the front plate 28' form a sealed hollow compartment for the light source 23' and the at least one sensor 27'. The front plate 28' may be a Mylar® or semi-clear plastic lens.

Figure 2:
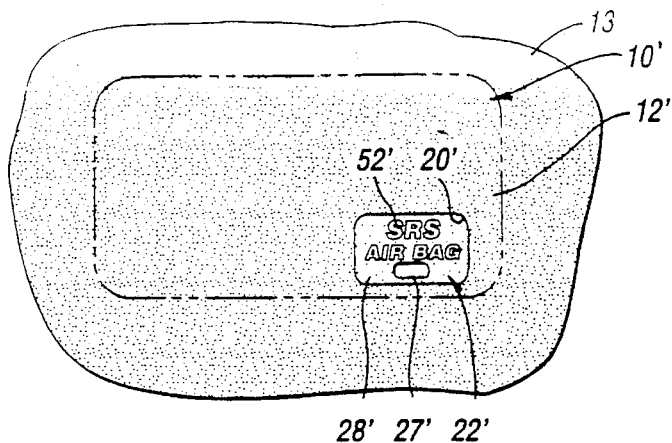
FIG. 2 is a partially broken away front elevation view of one embodiment of the air bag cover.
Figure 4:
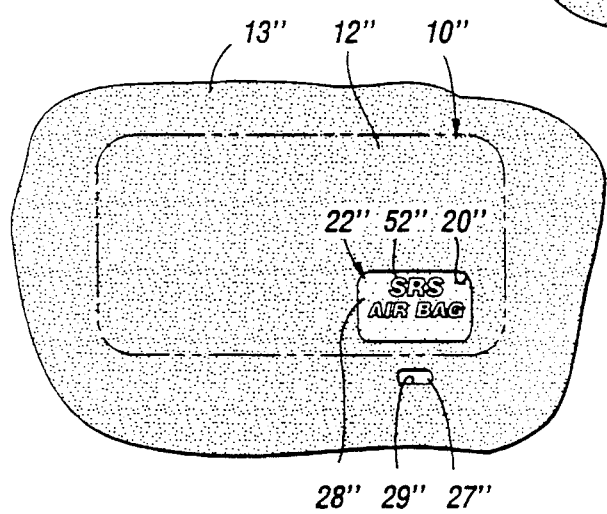
FIG. 4 is another view similar to FIG. 2 illustrating a third embodiment of the air bag cover.
Figure 5:
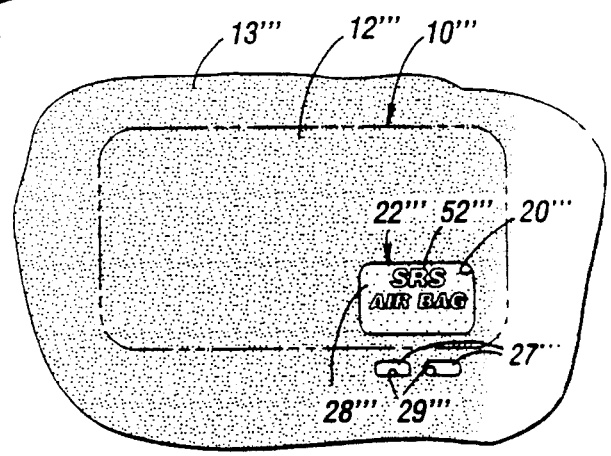
FIG. 5 is yet another view similar to FIG. 2 illustrating a fourth embodiment of the air bag cover.

As illustrated in FIGS. 1, 3 and 5, instead of a single sensor, a sensor pair 27 and 27''' are provided wherein one of the sensor pairs acts as the transmitter and the other of the sensor pairs acts as a receiver. Alternatively, only a single sensor such as illustrated in FIGS. 2, 4 and 7 at 27' and 27'' and 27'''', respectively, is utilized wherein the single sensor acts as a transceiver (i.e., acts not only as a transmitter but also as a receiver).

Referring now specifically to FIGS. 6 and 7, there are illustrated first and second embodiments of back plates, generally indicated at 32' and 32'''', respectively. Each of the back plates 32' or 32'''' is secured to the inner surface 16' or 16'''' of its front panel 12' or 12'''' in containing relationship to their respective unitary modules 22' or 22'''' to form hollow compartments for their unitary modules 22' or 22''''.

With specific reference to FIG. 6, the back panel 32' is secured by a C-shaped locking rim, generally indicated at 33', integrally formed at the rear inner surface 16' of the front panel 12' about the window 20'. The locking rim 33' includes a locking groove 35' in which the back plate 32' is snap fit.

With specific reference to FIG. 7, the back panel 32'''' includes a plurality of apertures 36'''' formed therethrough for receiving retaining stakes 38'''' integrally formed and rearwardly extending at the rear inner surface 16'''' of the front panel 12''''.

Figure 9:
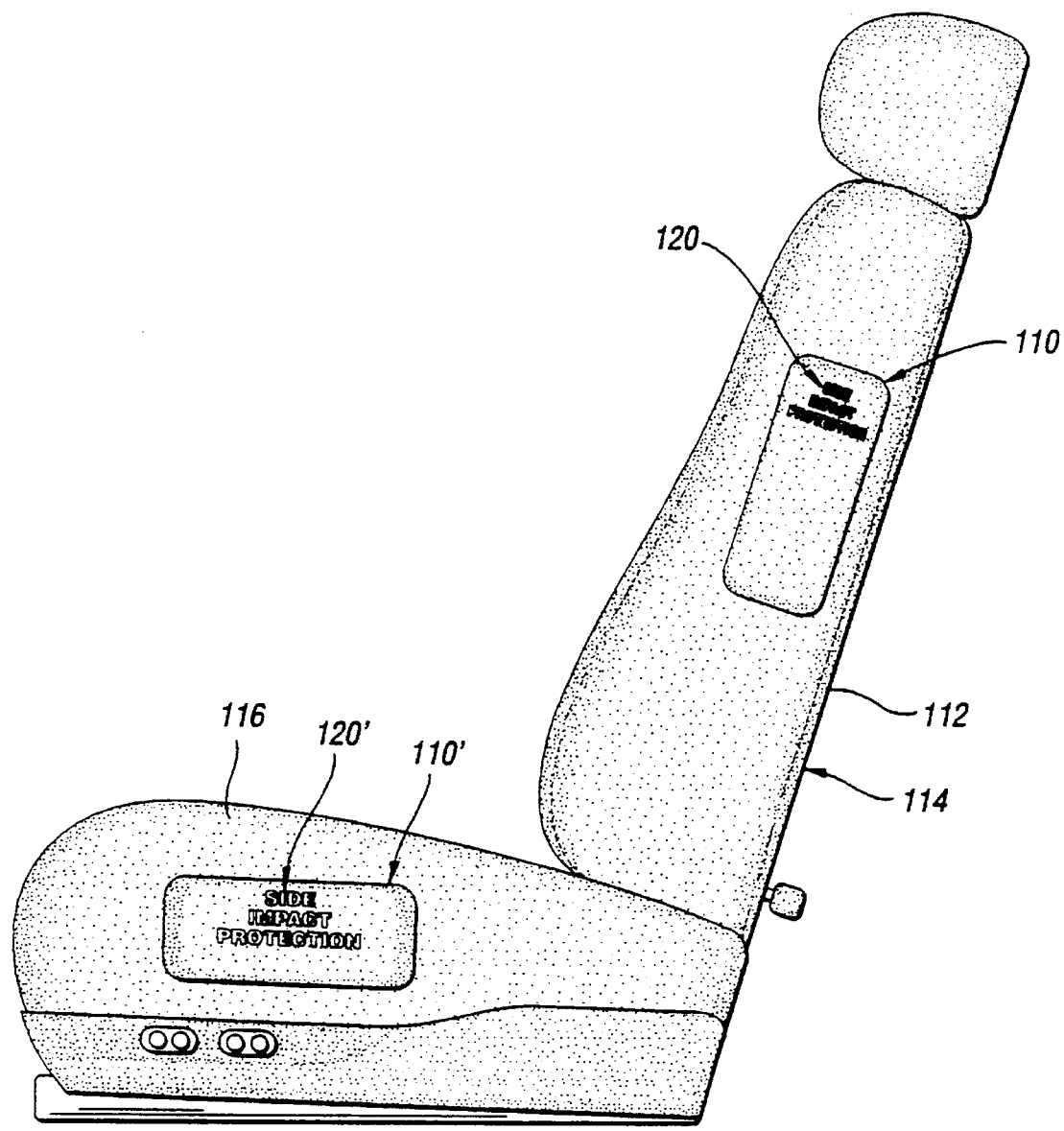
FIG. 9 is a side elevational view illustrating two alternative locations of an air bag cover constructed in accordance with the present invention.

Referring now to FIG. 9, there are illustrated other embodiments of an air bag cover, generally indicated at 110 and 110', constructed in accordance with the present invention. The cover 110 is secured at a back side 112 of a driver or passenger seat, generally indicated at 114. The cover 110' is secured to a bottom side 116 of the seat 114. Light source modules 120 and 120' are similar to the module 22' except they do not include a sensor or sensor pair. Like the module 22', the modules 120 and 120' include illuminated indicia or graphics such as the phrase "SIDE IMPACT PROTECTION".

As illustrated in FIGS. 4 and 5, a single aperture 29'' or aperture pair 29''' may be formed through the instrument panel 13'' or 13''', respectively, so that the sensor 27'' or sensor pair 27''' may be located immediately adjacent the hole in the instrument panel 13'' or 13''' in which the air bag cover 10'' or 10''' is visible.

As illustrated in FIGS. 1 through 5 with respect to the embodiments of the air bag covers 10 through 10''' illustrated therein, each of the front plates 28 through 28''' may include visually perceptible transparent or translucent indicia 52 through 52''' to identify that its respective air bag cover covers a supplemental restraint system (SRS) such as an inflatable air bag.

Light from its light source 23' and 23'''' is transmitted through the indicia 52', to form an information-bearing image within the passenger compartment to convey its safety information to the passengers of the vehicle. Alternatively, each of the light source 23' and 23'''' generates the light pattern which forms the message and the front plates 28 through 28'''' are substantially transparent or translucent.

While the best mode for carrying out the invention has been described in detail, those familiar with the art to which this invention relates will recognize various alternative designs and embodiments for practicing the invention as defined by the following claims.

What is claimed is:

1. A plastic air bag cover having an integrated light source and adapted for use within a passenger compartment of a vehicle, the cover comprising:

a front panel adapted to overlie an undeployed air bag, the front panel having a front outer surface and rear inner surface, wherein the front panel has a window associated therewith capable of transmitting light therethrough;

a light source module including a base plate and a light source mounted on the base plate; and a back plate secured to the rear inner surface of the front panel in containing relationship to the light source module to form a hollow compartment for the light source module wherein light from the light source is transmitted through the window to provide an information-bearing image within the passenger compartment whereby information is provided to a passenger of the vehicle.

2. The air bag cover as claimed in claim 1 wherein the light source module includes a front plate secured to the base plate to form a sealed compartment for the light source and wherein the front plate is provided with indicia capable of transmitting light therethrough and representing graphical information and wherein light from the light source transmitted through the indicia causes the image to be projected into the passenger compartment.

3. The air bag cover as claimed in claim 1 wherein the light source is an emissive display.

4. The air bag cover as claimed in claim 3 wherein the emissive display is an electroluminescent display.

5. The air bag cover as claimed in claim 4 wherein the electroluminescent display is a thin film electroluminescent display.

6. The air bag cover as claimed in claim 3 wherein the emissive display includes an LED.

7. The air bag cover as claimed in claim 3 wherein the emissive display is a plasma display.

8. The air bag cover as claimed in claim 1 wherein the light source is a flat panel display.

9. The air bag cover as claimed in claim 8 wherein the flat panel display is an emissive display.

10. The air bag cover as claimed in claim 9 wherein the emissive display is an electroluminescent display.

11. The air bag cover as claimed in claim 10 wherein the electroluminescent display is a thin film electroluminescent display.

12. The air bag cover as claimed in claim 9 wherein the emissive display is a plasma display.

13. The air bag cover as claimed in claim 8 wherein the flat panel display is a non-emissive display.

14. The air bag cover as claimed in claim 13 wherein the non-emissive display is a liquid crystal display.

15. The air bag cover as claimed in claim 13 wherein the non-emissive display includes an optical fiber.

16. The air bag cover as claimed in claim 1 further comprising means adapted to secure the cover to a seat back side.

17. The air bag cover as claimed in claim 1 further comprising means adapted to secure the cover to a seat bottom side.

18. The air bag cover as claimed in claim 1 further comprising means adapted to secure the cover to an instrument panel of the vehicle.

* * * * *